US006455112B1

(12) United States Patent
Ohkuma et al.

(10) Patent No.: US 6,455,112 B1

(45) Date of Patent: Sep. 24, 2002

(54) METHOD OF MANUFACTURING INK JET RECORDING HEAD AND INK JET RECORDING HEAD MANUFACTURED BY THE METHOD

(75) Inventors: Norio Ohkuma, Machida; Masashi Miyagawa, Yokohama; Hiroaki Toshima, Tokyo, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/571,594

(22) Filed: May 15, 2000

Related U.S. Application Data

(63) Continuation of application No. 08/377,937, filed on Jan. 25, 1995, now abandoned.

(30) Foreign Application Priority Data

Jan. 31, 1994 (JP) ............................................ 6-010079

(51) Int. Cl.[7] ........................... G11B 5/127; B41J 2/16; C08J 3/28; G03C 1/725

(52) U.S. Cl. .................... 427/504; 427/510; 430/280.1; 522/25; 522/31; 522/150; 522/166; 522/170; 347/20; 347/65; 216/27

(58) Field of Search ........................... 216/27; 427/510, 427/504; 347/20, 44, 47, 65; 430/270.1, 280.1; 522/31, 25, 170

(56) References Cited

U.S. PATENT DOCUMENTS

| | | | | |
|---|---|---|---|---|
| 5,478,606 | A | 12/1995 | Ohkuma et al. | 427/555 |
| 5,730,889 | A | 3/1998 | Miyagawa et al. | 216/27 |
| 5,786,832 | A | 7/1998 | Yamanaka et al. | 347/45 |
| 5,992,981 | A | 11/1999 | Sugitani et al. | 347/63 |
| 6,155,677 | A | 12/2000 | Kitani et al. | 347/65 |

FOREIGN PATENT DOCUMENTS

| | | |
|---|---|---|
| EP | 0432795 | 6/1991 |
| EP | 0491560 | 6/1992 |
| EP | 0500068 | 8/1992 |

(List continued on next page.)

OTHER PUBLICATIONS

Crivello, J.V. and Lam, J.H.W., "New Photoinitiators for Cationic Polymerization", Fourth International Symposium on Cationic Polymerization, J. Polymer Sci.: Symposium No. 56, pp. cover, 383–95 (1976).

*Primary Examiner*—Susan W. Berman
(74) *Attorney, Agent, or Firm*—Fitzpatrick, Cella, Harper & Scinto

(57) ABSTRACT

A highly reliable ink jet recording head excellent in mechanical strength, weatherability, ink resistance, and adhesion to the substrate is provided. For its production, a cationically polymerized curing product of an epoxy resin having a structural unit expressed by the following formula (I) or (II),

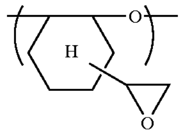

(I)

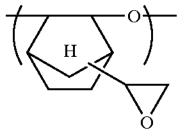

(II)

is used as a resin material which coats an ink flow path pattern formed from a dissoluble resin on the substrate.

5 Claims, 4 Drawing Sheets

FOREIGN PATENT DOCUMENTS

| | | |
|---|---|---|
| JP | 57-208255 | 12/1982 |
| JP | 57-208256 | 12/1982 |
| JP | 60-161973 | 8/1985 |
| JP | 61-154947 | 7/1986 |
| JP | 63-221121 | 9/1988 |
| JP | 64-9216 | 1/1989 |
| JP | 2-140219 | 5/1990 |
| JP | 3-184868 | 8/1991 |
| JP | 4-10940 | 1/1992 |
| JP | 4-10941 | 1/1992 |
| JP | 4-10942 | 1/1992 |
| JP | 5-330066 | 12/1993 |

METHOD OF MANUFACTURING INK JET RECORDING HEAD AND INK JET RECORDING HEAD MANUFACTURED BY THE METHOD

CROSS-REFERENCE TO RELATED APPLICATION

This application is a continuation of application Ser. No. 08/377,937, filed on Jan. 25, 1995, now abandoned.

BACKGROUND OF THE INVENTION

1. Field of the Invention

The present invention relates to a method of manufacturing an ink jet recording head for generating droplets of a recording liquid for use in the ink jet recording process, and an ink jet recording head manufactured by the method.

2. Description of the Prior Art

An ink jet recording head used in the ink jet recording process generally comprises outlets for ejecting droplets of a recording liquid (hereinafter called orifices), a liquid flow path, and liquid ejection energy generating portions provided in a part of the liquid flow path. A known method for producing such an ink jet recording head comprises, for example, forming tiny grooves in a substrate such as glass or a metal by a processing means such as cutting or etching, and then joining the substrate having the grooves to a suitable top plate to form a liquid flow path.

However, cutting or etching of glass or a metal had a limited processing accuracy. Moreover, an ink jet recording head produced by such a conventional method had too great roughnesses in the inside surface of the liquid flow path formed by cutting, and different etching rates applied during production led to distortions in the liquid flow path. Thus, a liquid flow path with a constant flow path resistance was difficult to obtain, and the resulting ink jet recording head was liable to vary in recording characteristics. Furthermore, etching posed the disadvantages of many manufacturing steps and increased manufacturing costs. In addition, those conventional methods had the common drawback that when a grooved plate having the liquid flow path is to be laminated to the top plate having piezoelectric elements for generating ejection energy for ejecting droplets of a recording liquid as well as driving elements such as electrothermal converting elements, the alignment of these plates was difficult, resulting in poor mass-producibility.

To solve the above-described problems, the methods described in Japanese Patent Application Laid-open Nos. 208255/1982, 208256/1982 and 154947/1986 were worked out. These methods all form a highly processable (photosensitive) resin layer on a substrate. According to these methods, the ink jet recording head, placed in the usual use environment, is always in contact with a recording liquid (generally, an ink consisting essentially of water and, in many cases, being unneutral, or an ink consisting essentially of an organic solvent). Therefore, the head structural material constituting the ink jet recording head has to be the one that does not lower in strength under the influence from the recording liquid and that does not incorporate in the recording liquid such a harmful component as will deteriorate the recording liquid characteristics. That is, there has been a demand for a structural member which maintains high weatherability and high mechanical strength over a long period of use.

On the other hand, the methods described in Japanese Patent Application Laid-Open Nos. 208255/1982 and 208256/1982 comprise pattern-forming a nozzle comprising an ink flow path and orifice portions on a substrate with the use of a photosensitive resin material, the substrate having ink ejection pressure generating elements thereon, and then joining a cover such as a glass sheet onto the nozzle. These methods, however, involved the following problems:

(i) The member for bonding the top plate drips into the ink flow path, and changes its shape.

(ii) When the substrate is cut to form the ink ejection outlets, cuttings penetrate the ink flow path, making ink ejection unstable.

(iii) Since the substrate having a hollow portion where the ink flow path has been formed is severed, some of the resulting ink ejection outlets have imperfections.

These problems decreased the yield of the ink jet recording heads produced, and made it difficult to produce an ink jet recording head having a minuscule ink flow path structure and having numerous ink ejection outlets over its large length.

As a way of preventing the above problems, the method described in the aforementioned Japanese Patent Application Laid-Open No. 154947/1986 was proposed. This method comprises forming an ink flow path pattern using a dissoluble resin, coating the pattern with an epoxy resin or the like, followed by curing the resin, severing the substrate, and then removing the dissoluble resin by dissolution. With this method, adhesion and severance are performed with the ink flow path being filled with the dissoluble resin. Thus, the above-described problems, dripping of the adhesive into the ink flow path, penetration of dust, and breakages or cracks of the ejection outlets, can be prevented.

When, as noted above, the ink flow path is to be formed by forming a dissoluble resin into an ink flow path pattern, and finally removing it by dissolution, it is required that the dissoluble resin serving as the ink flow path pattern not be dissolved or deformed by the resin coating the pattern so that a high accuracy ink flow path can be obtained. In view of this requirement, Japanese Patent Application Laid-Open No. 184868/1991 proposes a material suitable as a constituent member for an ink jet recording head for use in the above-mentioned manufacturing method. This material is a cationically polymerizable compound of an aromatic epoxy resin which is liquid at ordinary temperatures. According to the manufacturing method described in this publication, this liquid resin is used as the resin for coating the ink flow path pattern. Hence, a solvent need not be used to apply the coating resin, and consequently, the ink flow path pattern is neither dissolved nor deformed. Furthermore, this publication discloses that the cationically polymerizable compound of the aromatic epoxy resin is a resin composition causing little interaction with the ink, showing high chemical resistance, and undergoing minimal peeling.

However, the manufacturing method described in the Japanese Patent Application Laid-Open No. 184868/1991, as stated earlier, uses a resin, which is liquid at ordinary temperatures, so as to obtain a desired viscosity without using a solvent, in order to prevent the deformation of a dissoluble resin serving as an ink flow path pattern. Thus, this method was very disadvantageous in selecting materials. In addition, the way of applying this resin was also defective in that a widely used simple technique, such as solvent coating, could not be employed, since the resin itself is liquid at ordinary temperatures.

SUMMARY OF THE INVENTION

The present invention has been accomplished in light of the above problems. The object of this invention is to provide a material as a constituent member for an ink jet recording head, the material being excellent in mechanical strength, weatherability, ink resistance, and adhesion to the substrate, permitting a wide range of materials to be chosen, and being capable of easy coating, as well as to provide a manufacturing method using this material, and a high grade ink jet recording head obtained by the manufacturing method.

A method of manufacturing an ink jet recording head according to the present invention intended to attain the above object comprises the steps of:

(a) forming an ink flow path pattern on a substrate with the use of a dissoluble resin, the substrate having ink ejection pressure generating elements thereon;

(b) forming on the dissoluble resin layer a coating resin layer which will serve as ink flow path walls; and (c) dissolving the dissoluble resin layer to form an ink flow path; wherein for the coating resin layer there is used a cationically polymerized curing product of an epoxy resin having a structural unit expressed by the following formula (I) or (II), the epoxy resin being soluble in a solvent which does not deform the resin forming the ink flow path pattern:

(I)

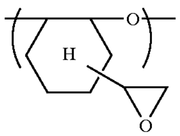

(II)

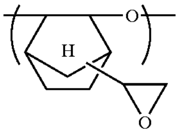

The suitable initiator for the cationic polymerization may be an aromatic onium salt.

The coating resin may contain a reducing agent for the cationic polymerization initiator. The reducing agent may be copper triflate.

The desirable epoxy equivalent of the epoxy resin may be 2000 or less.

The solvent which does not deform the resin forming the ink flow path pattern may be a non-polar solvent, and the coating resin layer may be formed by solvent coating using this solvent.

The dissoluble resin may be a positive resist or a solubility-changeable negative resist.

The above-mentioned curing product can be dissolved with the non-polar solvent for which the resist forming the ink flow path pattern shows insolubility. Therefore, the manufacturing method of the present invention enables the curing product to be applied by a simple method such as solvent coating without damaging the ink flow path pattern. Furthermore, the curing product has a high crosslinking density, and so has high mechanical strength. The curing product is also excellent in weatherability, ink resistance, and adhesion to the substrate. Thus, the use of the curing product of the present invention as a constituent material for an ink jet head makes it possible to provide a highly reliable ink jet recording head excellent in mechanical strength, weatherability, ink resistance, and adhesion to the substrate.

In the resulting ink jet recording head, the in-process coating resin layer becomes a grooved plate having a groove for forming the ink flow path on the ink ejection pressure generating elements, and openings serving as ink ejection outlets communicating with the ink flow path. The curing product that makes up the grooved plate has excellent adhesion to the substrate, as stated previously. Nevertheless, the grooved plate is fixed reliably to the substrate.

Therefore, the ink jet recording head of the present invention includes a substrate; a plurality of ink ejection pressure generating elements mounted at equal distances on one of the surfaces of the substrate; and a grooved plate being integrally fixed on the one surface of the substrate and having a groove and openings, the groove constituting an ink flow path on the ink ejection pressure generating elements, and the openings becoming ink ejection outlets communicating with the ink flow path; wherein the grooved plate is composed of a cationically polymerized curing product of an epoxy resin having a structural unit expressed by the following formula (I) or (II)

(I)

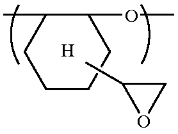

(II)

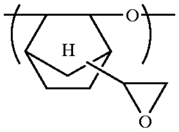

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
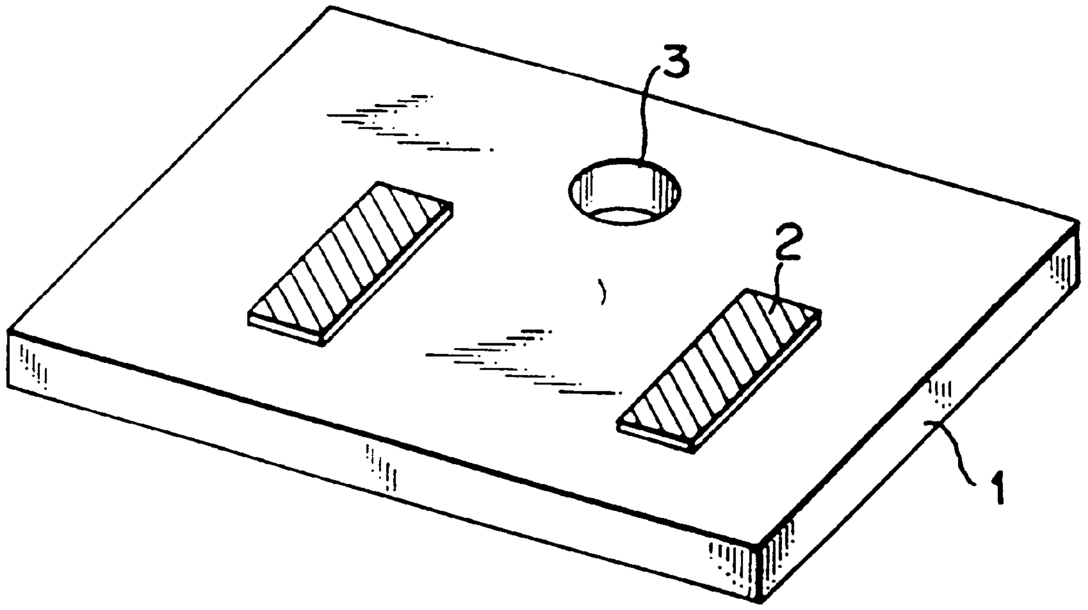
FIG. 1 is a schematic perspective view showing a substrate before the formation of an ink flow path and orifice portions.

The present invention will now be described in detail.

Examples of the epoxy resin having a structural unit expressed by the aforementioned formula (I) or (II) for use in the present invention are the compounds described in Japanese Patent Application Laid-Open Nos. 161973/1985, 221121/1988, 9216/1989 and 140219/1990. These compounds are polyfunctional epoxy compounds (with great epoxy equivalents), and their curing products have high crosslinking density and high mechanical strength. The epoxy groups of these compounds exhibit high cationic polymerizability compared with bisphenol A type epoxy. resins. Those compounds contain no aromatic ring at all, or if any, its content is extremely low, and their weatherability is excellent. They are not compatible with, and do not swell, a positive photosensitive material layer. Moreover, these compounds exhibit strong adhesion to the substrate, because during the manufacturing process, they may epoxidize the olefin with peracetic acid to form hydroxyl groups as by-products, thereby enhancing adhesion.

Concrete examples of the epoxy resin having the structural unit of the formula (I) or (II) are compounds expressed by the following general formula (1):

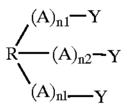

(1)

More specifically, the following compounds are cited, but the present invention is in no way limited thereto:

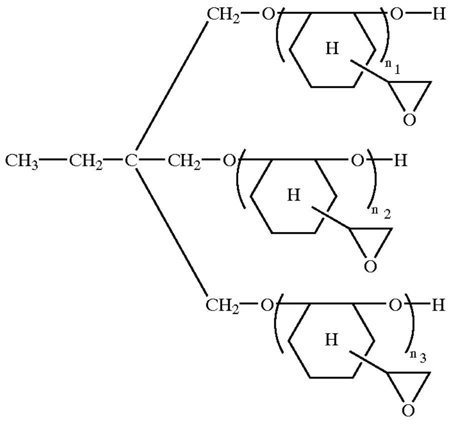

$n_1 + n_2 + n_3 \approx 10 \sim 15$

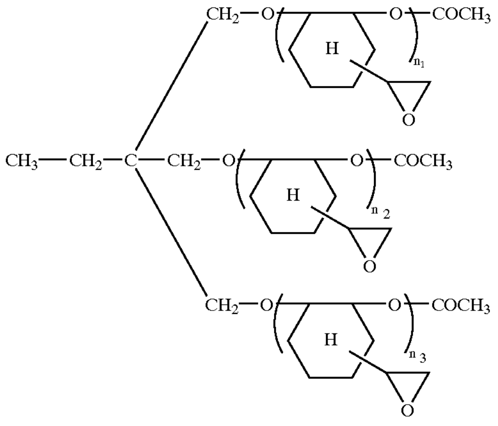

$n_1 + n_2 + n_3 \approx 15$

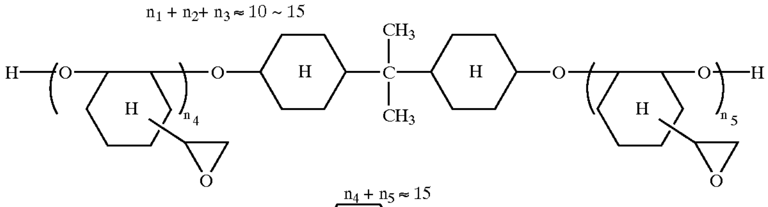

$n_4 + n_5 \approx 15$

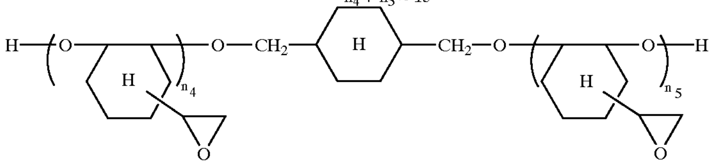

$n_4 + n_5 \approx 15$

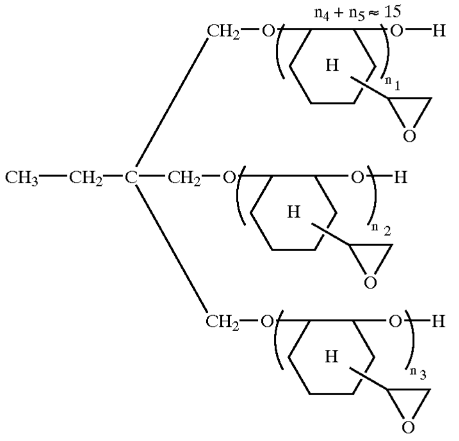

$n_1 + n_2 + n_3 \approx 15$

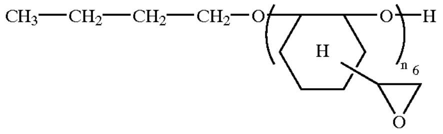

$n_6 \approx 10 \sim 25$

Of the above epoxy compounds, those with an epoxy equivalent of 2,000 or less are used preferably, and those with an epoxy equivalent of 1,000 or less are used more preferably. An epoxy equivalent in excess of 2,000 may lead to a decrease in the crosslinking density during the curing reaction, thereby lowering the Tg (glass transition temperature) or heat distortion temperature of the curing product, or deteriorating the adhesion or ink resistance.

The epoxy compounds are crosslinked and cured by suitable cationic polymerization curing agents. Known ones are usable as such curing agents. Cationic polymerization is a chain transfer reaction, and once this reaction is initiated, a curing product with a high crosslinking density (glass transition point) can be obtained in a relatively short time at a relatively low temperature. When the epoxy resin for use in the present invention is cured with an acid anhydride, it tends to show slightly high water absorption compared with a bisphenol A type resin. When the epoxy resin is cured by cationic polymerization, on the other hand, the crosslinking structure of the curing product comprises ether linkages, thus bringing the advantages of low water absorption, which means minimal swelling.

Examples of the cationic polymerization initiator include aromatic iodonium salts, aromatic sulfonium salts [see J. POLYMER SCI:Symposium No. 56, 383–395 (1976)], IRUGACURE marketed by Ciba-Geigy, and SP-170 and SP-150 marketed by Asahi-Denka Kogyo Kabushiki Kaisha. These cationic polymerization initiators start cationic polymerization upon irradiation with ultraviolet light. The combination of these cationic photopolymerization initiators with reducing agents enables cationic polymerization to be promoted under heat (i.e. the crosslinking density can be increased compared with cationic photopolymerization done without this combination). When the cationic photopolymerization initiator is combined with a reducing agent, however, it is necessary to select such a reducing agent as to give a redox type initiator system which does not react at ordinary temperatures, but reacts at a certain temperature or above (preferably 60° C. or above). Optimal as such a reducing agent is a copper compound, especially copper triflate (copper (II) trifluoromethanesulfonate) in view of the reactivity and the solubility in the epoxy resin.

To the above-described curing product of the epoxy resin, additives may be added if desired. For instance, flexibilizers may be added to increase the elasticity of the epoxy resin, or silane coupling agents may be added to obtain a further adhesion to the substrate.

In addition to the method described in the Japanese Patent Application Laid-Open No. 154947/1986, the curing product of the present invention can be applied to any method as long as the method forms an ink flow path pattern with the use of a dissoluble resin, provides a coating resin thereon, and finally dissolves the dissoluble resin to form an ink flow path. Preferably, the curing product can be used particularly for the manufacturing method described in Japanese Patent Application No. 144502/1992, namely, a method of manufacturing an ink jet recording head which comprises the steps of:

forming an ink flow path with the use of a dissoluble resin, forming on the dissoluble resin layer a coating resin layer;

forming on the surface of the coating resin layer an ink ejection outlet pattern with the use of a material having high resistance to oxygen plasma;

dry etching the resin layer with oxygen plasma using the ink ejection outlet pattern as a mask to form ink ejection outlets; and dissolving the dissoluble resin layer.

The present invention will be described in more detail with reference to the accompanying drawings.

FIGS. 1 to 6 are schematic views for illustrating the fundamental embodiment of the present invention, and each of these drawings shows an example of the construction of and the manufacturing procedure for the ink jet recording head employing the curing product of the present invention. The instant example illustrates an ink jet recording head with two orifices. It goes without saying, however, that the same is true for a high-density multi-array ink jet recording head with more than two orifices.

In the instant embodiment, a substrate 1 comprising glass, ceramic, plastic or metal as shown in FIG. 1 is employed.

The substrate 1 may be of any shape or any material as long as it can function as a part of the liquid flow path constituting member and as a support for the material layers that form the ink flow path and ink ejection outlets to be described later. On the substrate 1 are disposed a desired number of ink ejection energy generating elements 2 such as electrothermal converting elements or piezoelectric elements (in FIG. 1, two such elements 2 are exemplified). By the ink ejection energy generating elements 2, ejection energy for ejecting droplets of a recording liquid is imparted to the ink, and recording done. Incidentally, when an electrothermal converting element is used as the ink ejection energy generating element 2, this element heats a nearby recording liquid, to generate air bubbles in the recording liquid, thereby generating an ejection energy. When a piezoelectric element is used, on the other hand, an ejection energy is generated by its mechanical vibrations.

To these elements 2 are connected control signal input electrodes (not shown) for causing these elements to act. In an attempt to improve the durability of these ejection energy generating elements, it is customary practice to provide various functional layers such as protective layers. Needless to say, provision of such functional layers is acceptable.

FIG. 1 exemplifies a form in which an opening 3 for feeding ink (ink feed inlet) is provided in the substrate beforehand, and ink is fed from behind the substrate. In forming the opening, any means can be used so long as it is capable of forming a hole in the substrate. For instance, mechanical means such as a drill, or a light energy such as laser may be employed. Alternatively, it is permissible to form a resist pattern or the like in the substrate, and chemically etch it.

It goes without saying that the ink feed inlet may be formed in the resin pattern rather than in the substrate, and provided on the same plane as the ink ejection outlets with respect to the substrate.

Figure 2:
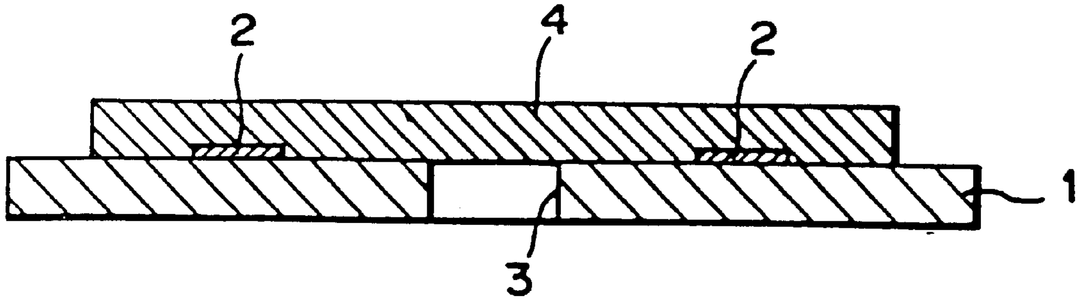
FIG. 2 is a schematic view showing the substrate of FIG. 1 having a dissoluble ink flow path pattern formed thereon.

Then, as shown in FIG. 2, an ink flow path pattern 4 is formed from a dissoluble resin on the substrate 1 including the ink ejection energy generating elements 2. The commonest means for forming the pattern would be one using a photosensitive material, but means such as screen printing can be employed.

When the photosensitive material is used, a positive resist or a solubility-changeable negative resist can be used, since the ink flow path pattern 4 is dissoluble.

As the positive resist, there can be used positive photoresists comprising mixtures of alkali-soluble resins (novolak resins, polyhydroxystyrene) and quinone diazide or naphthoquinone diazide derivatives, or photodecomposable positive resists photosensitive to ionizing radiation such as electron rays, deep-UV radiation or X-rays. Examples of the photodecomposable resists are vinylketone polymers such as polymethyl isopropenyl ketone or polyvinyl ketone, methacrylate polymers such as polymethacrylic acid, polymethyl methacrylate, polyethyl methacrylate, poly-n-butyl methacrylate, polyphenyl methacrylate, polymethacrylamide, or polymethacrylonitrile, and olefin sulfone polymers such as polybutene-1-sulfone or polymethylpentene-1-sulfone.

The solubility-changeable negative resist is a resist which undergoes a change in the polarity of the polymer side chains by the action of ultraviolet radiation or ionizing radiation and is developed with a polar solvent or a non-polar solvent. For instance, when ionizing radiation is applied to a polymeric compound having the hydroxyl groups of polyhydroxystyrene converted into t-butoxycarbonylesters, the ester linkages are severed. Thus, the exposed areas are converted into hydroxyl groups, becoming insoluble in a non-polar solvent such as toluene. If developed with a non-polar solvent, therefore, the exposed areas can remain undissolved, forming a negative resist pattern. Since the exposed areas are not gelled, they dissolve rapidly in a polar solvent.

When the substrate 1 having the ink feed inlet 3 therein is used, a preferred method for forming the resist layer 4 is to dissolve the photosensitive material in a suitable solvent, coat the solution onto a film of PET or the like, followed by drying to prepare a dry film, and laminate the dry film on the substrate. In this case, it is preferred to use as the photosensitive material a polymer-containing material having high coating properties and capable of lamination on the ink feed inlet 3, specifically, a photosensitive resin degradable by ionizing radiation such as electron rays, deep-UV radiation or X-rays. If a substance removable by a subsequent step is filled into the ink feed inlet 3, followed by forming a film by an ordinary solvent-coating method such as spin-coating or roll-coating, any of the above-mentioned materials may be used.

Figure 3:
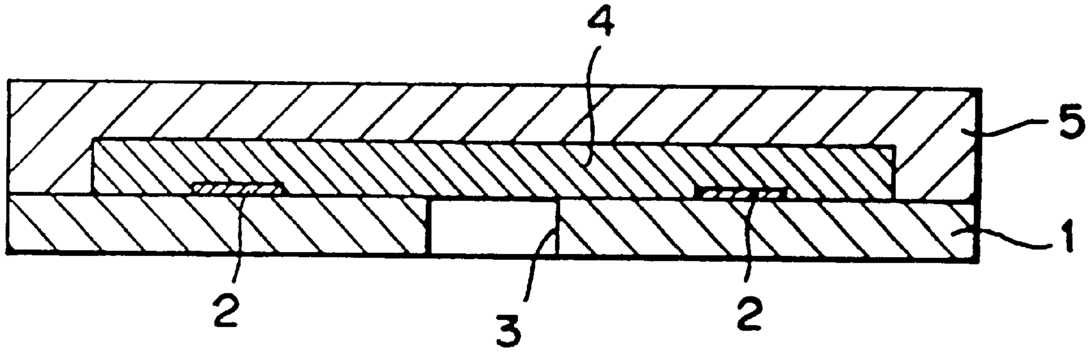
FIG. 3 is a schematic view showing the substrate of FIG. 2 having a coating resin layer formed thereon.

On the dissoluble resin material layer (resist layer) having the liquid flow path so patterned is further formed a resin layer 5, as illustrated in FIG. 3. This resin is to characterize the manufacturing method of the present invention, and to constitute a structural material for an ink jet recording head. Thus, it is required to have characteristics, such as high mechanical strength, heat resistance, adhesion to the substrate, resistance to the ink, and the feature of not deteriorating the ink.

Furthermore, the characteristic of causing no deformation to the dissoluble resin pattern is required during the step of forming the resin layer 5. The dissoluble resin pattern 4 is generally soluble in a polar solvent. The epoxy compound having the structural unit of the aforementioned formula (I) or (II) of the present invention exhibits high solubility in a non-polar solvent such as toluene or xylene. If solvent coating is performed using such a solvent, the coating resin layer 5 can be formed without any influence exerted on the dissoluble resin pattern 4.

In case the formation of the coating resin layer 5 is carried out by transfer molding or the like, thermal characteristics are required which will not deform the dissoluble resin pattern 4 at the molding temperature.

Figure 4:
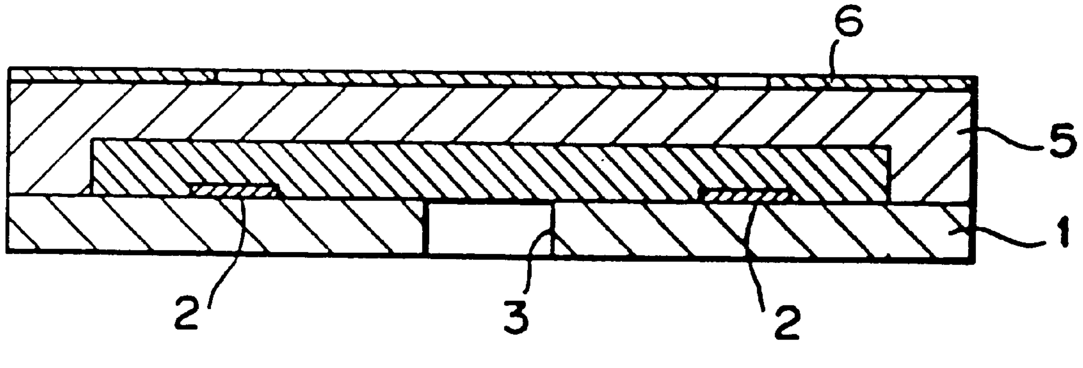
FIG. 4 is a schematic view showing the substrate of FIG. 3 having an ink ejection outlet pattern formed on the coating resin layer by use of a silicone resist.

Then, as shown in FIG. 4, a silicone resist 6 is used to form an ink ejection outlet pattern on the coating resin layer 5. The silicone resist 6 may be any resist enough resistant to etching by oxygen plasma to be described later. For example, there can be used chloromethylated polyphenylsiloxane (SNR RESIST, a product of Tohso), polydimethylsiloxane, polymethylsilsesquioxane, polyphenylsilsesquioxane, and silicon-containing polymethacrylate resin. These resists are generally sensitive to ionizing radiation, and exposure to deep-UV radiation or electron rays is desirable. In recent years, however, studies have been conducted on the silicone resists sensitive to ultraviolet light, and these resists can also be used.

Figure 5:
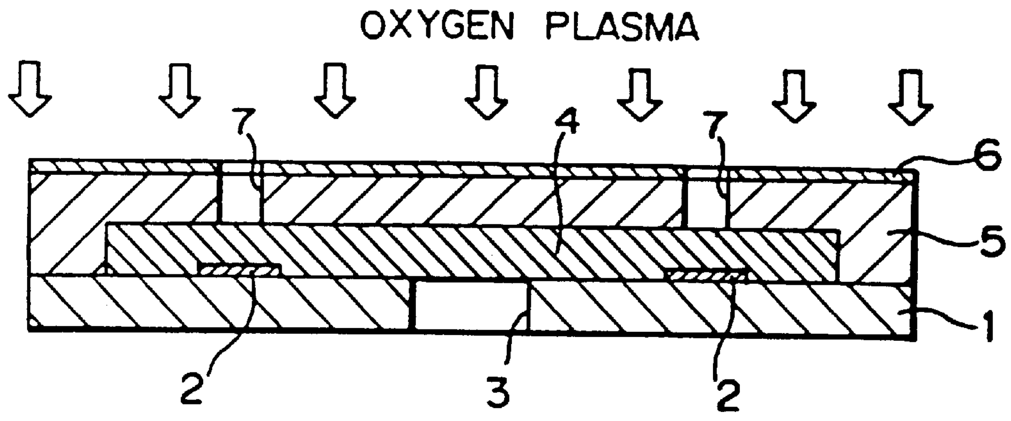
FIG. 5 is a schematic view showing the substrate of FIG. 4 having ink ejection outlets formed in the coating resin by means of oxygen plasma.

Then, as illustrated in FIG. 5, ink ejection outlets 7 are formed in the coating resin layer 5 by use of oxygen plasma with the silicone resist pattern 6 serving as a mask. The oxygen plasma etching should desirably be performed using an anisotropic etching apparatus such as a reactive ion etching apparatus or a magnetron type ion etching apparatus. The etching conditions should also involve optimal oxygen gas pressure and optimal electric power applied which will enable anisotropic etching. The silicone resist 6 is minimally etched by this etching procedure, and thus can form the ink ejection outlets 7 with high accuracy. The end point of etching is the stage when etching reaches the dissoluble resin pattern, and there is no need to detect a high accuracy end point for etching. The epoxy compound having the structural unit of the formula (I) or (II) for use in the present invention has no, or a very low if any, content of aromatic ring in its structure. Therefore, compared with the conventional bisphenol A type epoxy resins or O-cresol novolak type epoxy resins with a high content of aromatic rings, that epoxy compound enjoys a high rate of etching with oxygen plasma, thus permitting an increased throughput.

Figure 6:
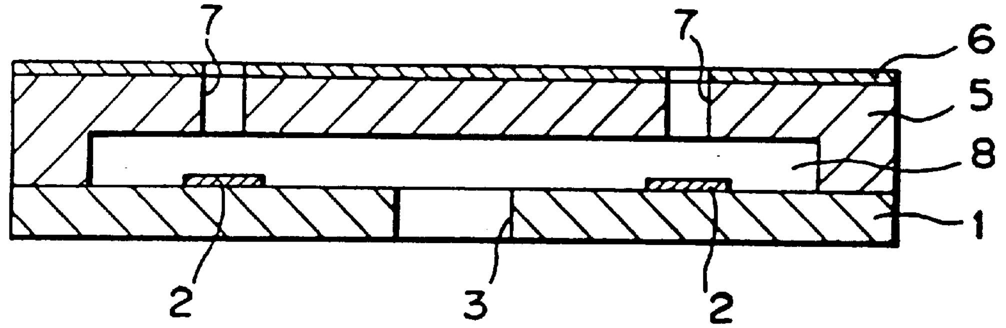
FIG. 6 is a schematic view showing the substrate of FIG. 5 having the dissoluble resin pattern dissolved therefrom.

Finally, as depicted in FIG. 6, the dissoluble resin 4 forming the ink flow path pattern is dissolved with a solvent. The dissolution is easily performed by dipping the substrate in the solvent or spraying the solvent on the substrate. Joint use of ultrasonic waves can shorten the duration of dissolution.

Figure 7:
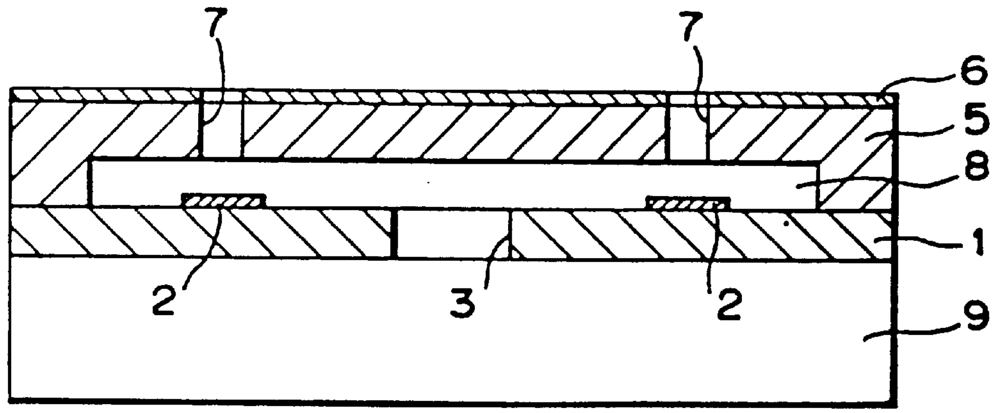
FIG. 7 is a schematic view showing an ink jet recording head comprising the substrate of FIG. 6 provided with an ink feeding means.

The substrate having an ink flow path 8 and the ink ejection outlets 7 thus formed thereon is provided with a member 9 for feeding ink and an electrical connection for driving the ink ejection pressure generating elements 2 to complete an ink jet recording head, as shown in FIG. 7.

The present invention brings excellent effects with a recording head for bubble jet recording among various techniques for ink jet recording. It is optimal, particularly, for the manufacturing methods for ink jet recording heads described in Japanese Patent Application Laid-Open Nos. 10940/1992, 10941/1992, 10942/1992. The ink jet recording heads described in these publications apply information signals to ink ejection pressure generating elements (electrothermal converting elements) in response to recorded information to cause the electrothermal converting elements to generate heat energy inducing a rapid temperature increase surpassing the nucleate boiling of the ink, thereby forming air bubble in the ink, and release these air bubbles to the atmosphere to eject ink droplets. These ink jet recording heads stabilize the volume and velocity of the ink droplets, giving a high grade image. According to the methods described in those publications, the distance between the electrothermal converting element and the orifice virtually determines the ejection volume. Thus, the present invention that can set the distance between the electrothermal converting element and the orifice accurately and with good reproducibility is the most suitable for these methods. Moreover, the present invention is effective for a full-line type recording head capable of recording onto the whole width of a recording paper at the same time, and for a color recording head integrated with the recording head or having a plurality of the recording heads combined.

Also, the recording head according to the present invention is applicable to ink which is not liquid; it is applied preferably to solid ink which liquefies at more than a certain temperature. In this case, the head is always heated during recording in order to keep the solid ink liquid. Since high thermal resistance is required of the member constituting the head, the cationically polymerized curing product of epoxy resin is preferred.

Examples of the present invention will be described below.

EXAMPLES 1 TO 6

Figure 8:
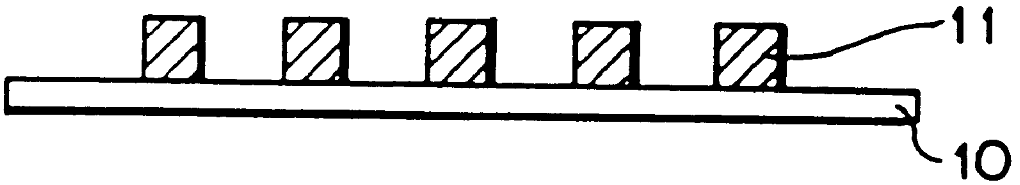
FIG. 8 is a schematic view showing an ink flow path pattern formed on a silicon substrate.

The instant examples represent the structural member for an ink jet recording head in accordance with the present invention. Here, samples were prepared by the method described in Japanese Patent Application Laid-Open No. 154947/1986, and evaluations made. First, Hoechst's positive resist AZ-4903 was spin-coated onto a silicon wafer 10 having an $SiO_2$ film prepared by thermal oxidation. The coating was baked for 10 minutes at 90° C., and exposed for 80 counts using Canon's mask aligner PLA600. Then, this material was developed with the alkali developer MIF-312 (a product of Hoechst) diluted 1:2 with pure water. Thereafter, it was rinsed with pure water to obtain a pattern 11 shown in FIG. 8.

Figure 9:
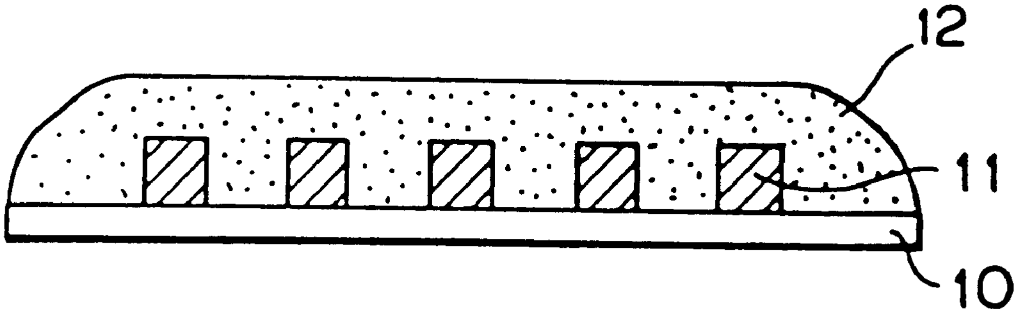
FIG. 9 is a schematic view showing the substrate of FIG. 8 having a coating resin layer formed thereon.

The pattern 11 had pitches of 31 and 75 μm with the 15 μm areas taken as the exposed areas (height 15 μm). Then, the pattern 11 was exposed again using the PLA600, and deaerated by a vacuum dryer to decompose the unreacted naphthoquinone diazide, while removing the accompanying nitrogen gas. Then, the resin compositions of the present invention revealed in Tables 1 to 3 were each dissolved in a non-polar solvent, xylene, and spin-coated onto the pattern 11. The coating was dried at 60° C. to form a coating resin layer 12 (FIG. 9). On this occasion, none of the resin compositions shown in Tables 1 to 3 deformed the resin pattern 11 formed from the AZ-4903. Then, the silicon wafer with the coating resin layer 12 was exposed for 30 seconds using Canon's. mask aligner PLA520 (using the cold mirror CM250), followed by baking for 1 hour at 60° C., to induce a cationic polymerization reaction.

Figure 10:
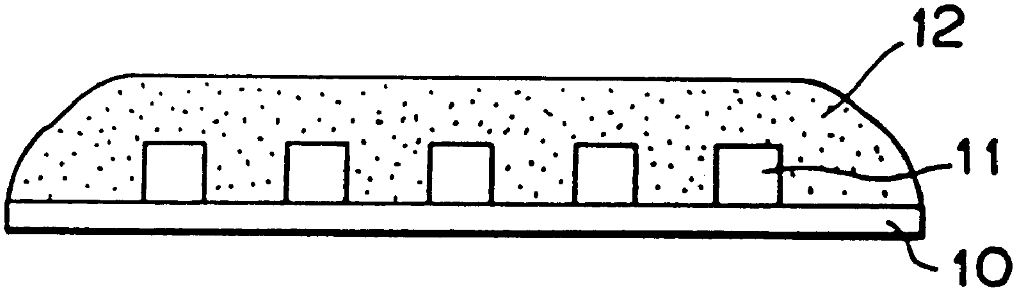
FIG. 10 is a schematic view showing the substrate of FIG. 9 having the dissoluble resin pattern dissolved therefrom.

Then, the wafer 10 was cut to a suitable size, and the pattern 11 from the AZ-4903 was dissolved with a methyl isobutyl ketone/ethanol (1/1 wt.) solvent mixture. Baking for 1 hour at 150° C. was performed (FIG. 10). The so obtained sample piece was dipped in ink (pure water/glycerin/Direct Black 154 (water-soluble black dye)=65/30/5), and subjected to a pressure cooker test (PCT, 120° C., 2 atm, 50 hours). None of the resin compositions shown in Tables 1 to 3 exhibited deformation or peeling from the silicon wafer. Then, a sample piece prepared in the same way was dipped in solid ink (ethylene carbonate/1,12-dodecanediol/CI. Solvent Black 3 (oil-soluble black dye)=48/48/4), and stored for 1 month at 100° C. (the head portion heating temperature at the time of solid ink ejection). None of the resin compositions shown in Tables 1 to 3 exhibited deformation or peeling from the silicon wafer.

Then, the resin compositions shown in Tables 1 to 3 were each formed on a Kapton film (a product of Du Pont), exposed for 30 seconds using the PLA520 (CM250), and baked for 1 hour at 60° C. to prepare a sample. The glass transition point of the sample, determined by dynamic viscoelasticity evaluation (frequency 10 Hz, heating rate 5° C./min), was about 200° C. (film thickness 20 μm). As a control, the resin composition described in Example 1 of Japanese Patent Application Laid-Open No. 184868/1991 (bisphenol A type epoxy resin 93.5 parts, A-187 4.5 parts, SP-170 2 parts) was cured under the same curing conditions, and its glass transition temperature was determined. It was about 120° C. (film thickness 20 μm).

As demonstrated in the foregoing Examples, the structural member for the ink jet recording head according to the present invention does not show compatibility with, or swelling properties for, a novolak/naphthoquinone diazide resist (AZ-4903) which is the most ordinary positive resist. Its curing product is not affected by ink or solid ink, and has good adhesion to the substrate (silicon wafer). Furthermore, the ink jet recording head constituting member of the present invention has a high glass transition temperature and high mechanical strength.

EXAMPLES 7 TO 12

An ink jet recording head of the structure illustrated in FIG. 7 was produced in accordance with the procedure shown in FIGS. 1 to 7.

In a glass substrate 1 having electrothermal converting elements 2 (heaters composed of the material $HfB_2$) as ink ejection energy generating elements formed thereon, a through-hole 3 for feeding ink was formed by YAG laser. Then, a dry film prepared by coating polymethyl isopropyl ketone (ODUR-1010, Tokyo Ouka Kogyo Kabushiki Kaisha) onto PET, followed by drying, was transferred by lamination as a dissoluble resin layer onto the substrate. The ODUR-1010 was used in a concentrated form, because it has a low viscosity and cannot be formed into a thick film. After the composite was prebaked for 20 minutes at 120° C., it was pattern-exposed using Canon's mask aligner PLA520 (Cold Mirror CM290) for ink flow path formation. The exposure lasted for 1.5 minutes, development was carried out using methyl isobutyl ketone/xylene=2/1 wt., and rinsing used xylene. The resist pattern 4 was intended to secure the ink flow path between the ink feed inlet 3 and the electrothermal converting elements 2, and the resist pattern was left at a site where the flow path was to be formed. The thickness of the resist after development was 12 μm.

Then, resin compositions as shown in Table 1 which characterize the present invention were each dissolved in a xylene/methyl isobutyl ketone non-polar solvent mixture, and the solution was spin-coated to form a coating layer 5. Thereafter, exposure was performed for 30 seconds using the PLA520 (CM250), followed by 1 hour baking at 100° C. for cation polymerization reaction. The coating resin layer 5 was adjusted to have a thickness of 10 μm on the ink flow path pattern.

On the cured coating resin layer 5 was spin-coated a silicone negative resist (SNR RESIST, a product of Tohso Kabushiki Kaisha) to a thickness of 0.3 μm, and the coating was baked for 20 minutes at 80° C. On the resulting silicone resist layer 6 was superimposed a mask with a pattern corresponding to ink ejection outlets 7, and light was irradiated through the mask. Light irradiation was performed under contact exposure using the PLA520 (CM250). The exposure applied to the layer was about 60 $mj/cm^2$. The composite was developed with toluene for 1 minute, and dipped in isopropyl alcohol for 30 seconds for rinsing. The silicone resist of the instant embodiment is a negative resist, and pattern formation for the ink ejection outlets 7 is pattern formation of removing portion. This type of pattern formation is unfavorable for a minuscule pattern. Because of a small thickness of the resist, however, formation of a pattern measuring as small as $\phi 2\ \mu m$ is possible. In the instant embodiment, an ejection outlet pattern with a size of $\phi 15\ \mu m$ was formed.

Then, the coated substrate was introduced in a parallel plate type dry etching device (DEM-451, a product of Aneruba), where the epoxy resin layer 5 was etched with oxygen plasma. The oxygen gas pressure was 15 Pa, the power applied was 150 W, and the etching time was 40 minutes. By this etching, the ink ejection outlets 7 were perforated. With the resin formulation shown in Example 1, the etching rate was 0.30 $\mu$m/min. By varying the oxygen gas pressure and the applied power, the degree of anisotropy by etching can be varied, and the shape in the depth-wise direction of the ejection outlets 7 can be controlled slightly. With a magnetron type etching device, a further decrease in the etching time has been reported, and the use of this device is effective in improving the throughput.

Then, in order to remove the dissoluble resin layer (ODUR-1010), the composite was exposed for 2 minutes using the PLA520 (CM290), and dipped in methyl isobutyl ketone while under ultrasonic waves applied by an ultrasonic washer, to dissolve the ODUR-1010.

Finally, as shown in FIG. 7, an ink feeding member 9 was bonded to the ink feed inlet 3 to prepare an ink jet recording head.

The so prepared ink jet recording head was mounted to a recording apparatus, and recording was performed using an ink comprising pure water/glycerin/Direct Black 154 (water-soluble black dye)=65/30/5. Stable printing was possible.

Then, a heat cycle test was conducted (10 cycles, each cycle comprising keeping the specimen for 2 hours at each of the temperatures, −30° C., room temperature, and 60° C.), with the ink being filled, whereafter a printing test was performed again. Stable printing was possible, and no peeling of the nozzle portion occurred.

Then, recording was performed using a solid ink comprising ethylene carbonate/1,12-dodecanediol/CI. Solvent Black 3 (oil-soluble black dye)=48/48/4. Stable printing was possible. (The head was heated at 100° C. during recording, in order to maintain the solid ink in a liquid state. On this occasion, the head was fully heat resistant, and did not deform.)

As a control, the procedure of Example 7 was performed, except that the epoxy resin was replaced by a bisphenol A type epoxy resin (EPICOAT 1002). The coating resin was formed, the silicone resist was patterned, and etching was performed under the aforementioned conditions. The etching rate was 0.23 $\mu$m/min.

As another control, an anhydrous curing agent (hexahydrophthalic anhydride) was used at a ratio of curing agent/epoxy resin=0.6 instead of the cationic polymerization initiator. The curing conditions were 80° C., 1 hour+100° C., 2 hours+150° C., 2 hours+180° C., 5 hours. With the other conditions being the same as in Example 7, the head was prepared. When the above-mentioned liquid ink was used, printing was done stably. Then, a heat cycle test was conducted in the aforementioned manner. Interference fringes were noted in a part of the nozzle portion, and peeling from the substrate was observed.

TABLE 1

| | Epoxy compound | Cationic polymerization initiator | Additive |
|---|---|---|---|
| Ex. 1 | EHPE-3150<br>(Daicel Chemical)<br>94 parts | 4,4'-di-t-butyldiphenyliodonium hexafluoroantimonate<br>1 part | Silane coupling agent A-187<br>(Nihon Yuniker)<br>5 parts |
| Ex. 2 | EHPE-3150 70 parts<br>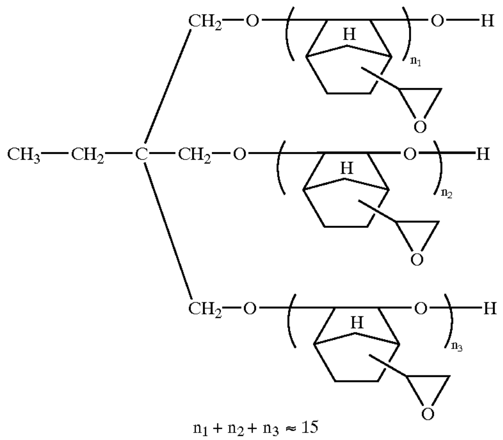<br>$n_1 + n_2 + n_3 \approx 15$<br>24 parts | 4,4'-di-t-butyldiphenyliodonium hexafluoroantimonate<br>1 part | Silane coupling agent A-187<br>(Nihon Yuniker)<br>5 parts |

TABLE 2

| | Epoxy compound | Cationic polymerization initiator | Additive |
|---|---|---|---|
| Ex. 3 | 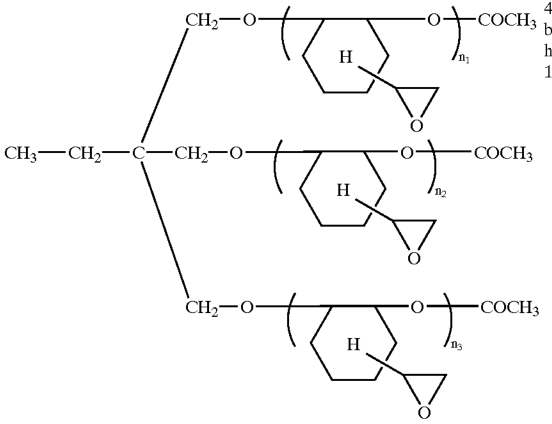 $n_1 + n_2 + n_3 \approx 15$ 94 parts | 4,4'-di-t-butyldiphenyliodonium hexafluoroantimonate 1 part | Silane coupling agent A-187 (Nihon Yuniker) 5 parts |
| Ex. 4 | 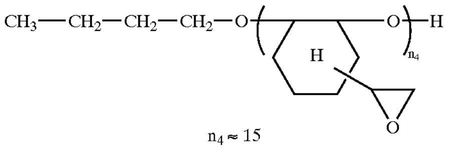 $n_4 \approx 15$ 94 parts | 4,4'-di-t-butyldiphenyliodonium hexafluoroantimonate 1 part | Silane coupling agent A-187 (Nihon Yuniker) 5 parts |

TABLE 3

| | Epoxy compound | Cationic polymerization initiator | Additive |
|---|---|---|---|
| Ex. 5 | 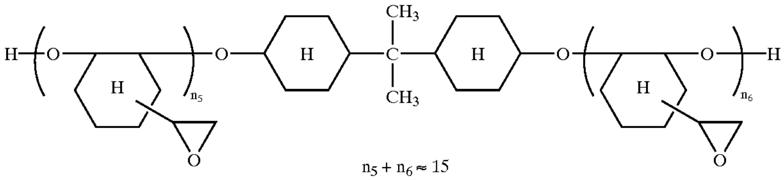 $n_5 + n_6 \approx 15$ 94 parts | 4,4'-di-t-butyldiphenyliodonium hexafluoroantimonate 1 part | Silane coupling agent A-187 (Nihon Yuniker) 1 part |
| Ex. 6 | 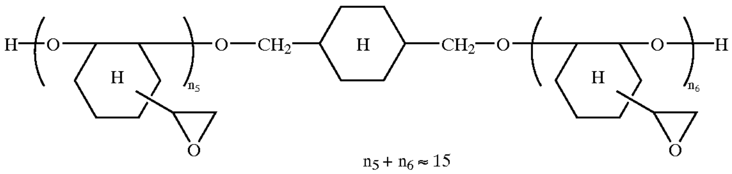 $n_5 + n_6 \approx 15$ 94 parts | 4,4'-di-t-butyldiphenyliodonium hexafluoroantimonate 1 part | Silane coupling agent A-187 (Nihon Yuniker) 1 part |

As described above, the present invention enables the curing product of the present invention to be dissolved in a non-polar solvent in which the resist forming the ink flow path pattern is insoluble. Thus, it becomes possible to coat the constituent layer by a simple method such as solvent coating, without damaging the ink flow path pattern, and to produce an inexpensive, highly accurate ink jet recording head. Furthermore, the use of the curing product of the present invention as a constituent material for an ink jet head makes it possible to provide a highly reliable ink jet recording head excellent in mechanical strength, weatherability, ink resistance, and adhesion to the substrate.

The present invention has been described in detail with respect to preferred embodiments, and it will now become clear that changes and modifications may be made without departing from the invention in its broader aspects, and it is our intention, therefore, in the appended claims to cover all such changes and modifications as fall within the true spirit of the invention.

What is claimed is:

1. A method of manufacturing an ink jet recording head, comprising the steps of forming an ink flow path pattern on a substrate using a dissoluble resin of a positive photosensitive material which forms a dissoluble resin layer, the substrate having ink ejection pressure generating elements thereon, and forming a coating resin layer on the substrate as well as on sides of the dissoluble resin layer, wherein the coating resin layer is obtained by photopolymerizing a composition including a cationically polymerizable epoxy resin, a cationic polymerization initiator and a non-polar solvent that does not deform the dissoluble resin, which will serve to form ink flow path walls, and wherein the cationically polymerizable epoxy resin is polymerized by activating the cationic polymerization initiator, the dissoluble resin layer is dissolved to form an ink flow path, the cationically polymerizable epoxy resin is a cationically curable composition of an epoxy resin having a structural unit expressed by the following formula (I) or (II), the epoxy resin being soluble in the non-polar solvent which does not deform the resin forming the ink flow path pattern, the coating resin layer is formed by solvent coating using the solvent, and the coating resin layer is cured by the photopolymerizing followed by being heated:

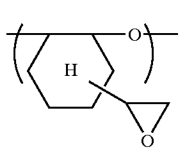

(I)

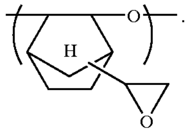

(II)

2. A method of manufacturing an ink jet recording head as claimed in claim 1, wherein the cationic polymerization initiator is an aromatic onium salt.

3. A method of manufacturing an ink jet recording head as claimed in claim 1, wherein the coating resin layer contains a reducing agent for the cationic polymerization initiator.

4. A method of manufacturing an ink jet recording head as claimed in claim 3, wherein the reducing agent is copper triflate.

5. A method of manufacturing an ink jet recording head as claimed in claim 1, wherein the epoxy equivalent of the epoxy resin is 2000 or less.

* * * * *

UNITED STATES PATENT AND TRADEMARK OFFICE
CERTIFICATE OF CORRECTION

PATENT NO. : 6,455,112 B1
DATED : September 24, 2002
INVENTOR(S) : Norio Ohkuma et al.

It is certified that error appears in the above-identified patent and that said Letters Patent is hereby corrected as shown below:

Column 5,
Lines 48-64, " 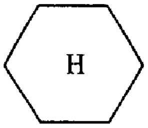

" (3 occurrences) should read -- 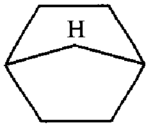

--.

Column 10,
Line 26, "O-cresol" should read -- o-cresol --.

Column 11,
Line 46, "Canon's." should read -- Canon's --.

Signed and Sealed this

Twenty-eighth Day of June, 2005

JON W. DUDAS
*Director of the United States Patent and Trademark Office*